March 24, 1936.  F. E. BARTLETT  2,034,968
POULTRY DRINKING FOUNTAIN
Filed March 25, 1935
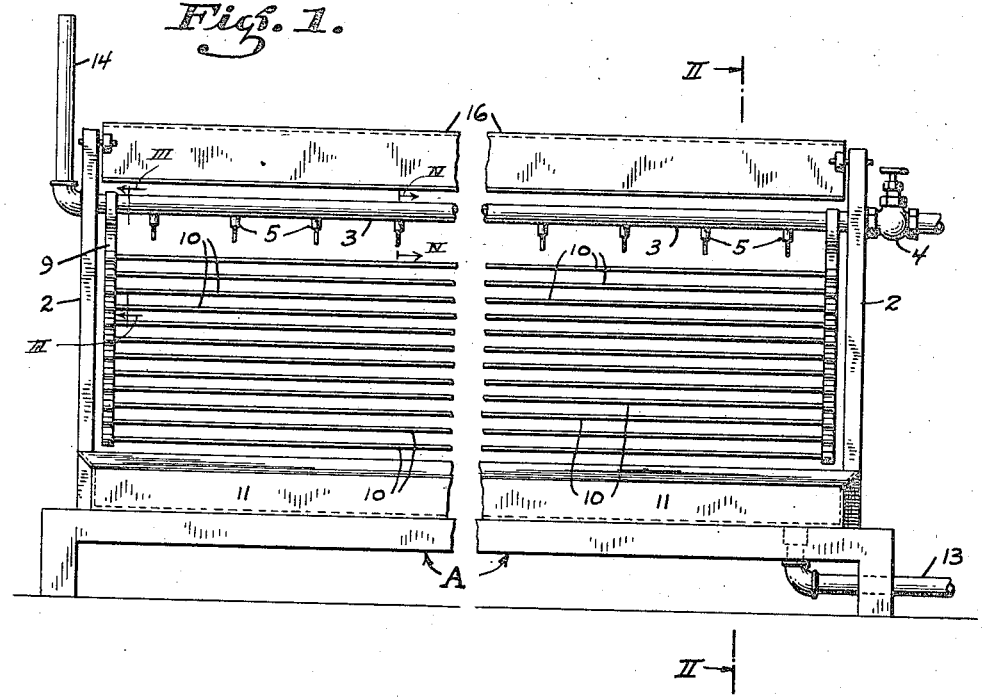
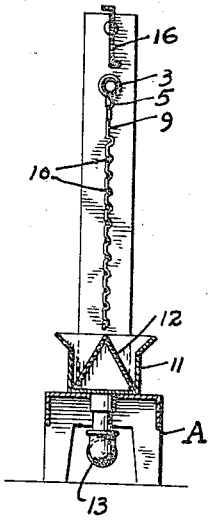
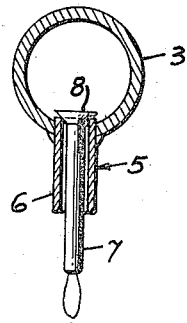
INVENTOR.
Frederick E. Bartlett
BY
Chas. E. Townsend
ATTORNEY.

Patented Mar. 24, 1936

2,034,968

UNITED STATES PATENT OFFICE 2,034,968

POULTRY DRINKING FOUNTAIN

Frederick E. Bartlett, Modesto, Calif.

Application March 25, 1935, Serial No. 12,810

4 Claims. (Cl. 119—74)

This invention relates to a sanitary drinking fountain for poultry and the like, and especially that type of fountain known as a "drip fountain".

The object of the present invention is generally to improve and simplify the construction and operation of drinking fountains of the character described; to provide a drinking fountain for poultry and the like that does not permit pollution of the water by the beaks of the poultry or by wading in the water, or otherwise; to provide a drinking fountain for poultry that will be economical in operation, insure a clean supply of fresh water and also control of the water used; to provide a drinking fountain in which the water is applied to a grid imposed in a series of superimposed parallel rods upon which the water drips from rod to rod forming innumerable drops at different elevations from which the individual chicks may drink, said grid being of a height to accommodate poultry of varying size and age; to provide a drinking fountain upon which the poultry can not roost and which is self-cleaning; to provide a trough for catching and carrying away waste water, said trough being provided with a guard member to prevent poultry from wading therein or drinking therefrom; to provide a drinking fountain which can be made in varying lengths to insure an ample supply of water regardless of the number of poultry in each yard or run; and, further, to provide a drinking fountain in which water is subjected to continuous aeration and partial evaporation to insure a cool water supply.

The drinking fountain is shown by way of illustration in the accompanying drawings, in which—

Fig. 1 is a side elevation of the fountain;

Fig. 2 is a vertical cross section taken on line II—II of Fig. 1;

Fig. 3 is an enlarged end view, partially in section, of one of the hangers whereby the grid is supported; said section being taken on line III—III of Fig. 1;

Fig. 4 is an enlarged vertical cross section through one of the drip feed rods, said section being taken on line IV—IV of Fig. 1.

Where poultry are raised extensively, it is common practice to have a watering trough in each yard from which the poultry can drink. This water becomes warm, because of exposure to sun and air, and worst of all it becomes dirty, contaminated and polluted by the beaks of the chickens drinking therefrom; and also due to the fact that the poultry often wade in the water.

The present invention embodies a system of supplying water by a drip feed and in a manner which prevents contamination and pollution. The fountain consists of a base member A having a pair of standards 2—2, one at each end thereof. Extending through the upper ends of the standards is a water supply pipe 3, the flow of water to said pipe being controlled by a valve 4 or similar means.

The supply pipe is provided with a series of drip rods, generally indicated at 5. An enlarged view of one of the drip rods is shown in Fig. 4. It consists of a tube 6 soldered, pressed, or otherwise secured in the tube 3, and in this tube is placed a rod 7 having a head 8 formed on the upper end; the rod being nothing more or less than a rivet.

The head of the rivet makes an imperfect seat with relation to the upper end of the tube 6, by roughening or otherwise, and the shank of the rivet is slightly less in diameter than the interior of the tube 6; hence permitting a small amount of water to continuously leak out of the supply pipe 3 around the head of the rivet and downwardly through the tube 6 where it will collect on the lower ends of the members 7 in the form of large drops.

Mounted at each end of the supply pipe 3 is a hanger arm 9, see Figs. 1 and 3, and secured between said hanger arms are a series of parallel superimposed rods 10, which will be referred to as grid or drip bars. The hanger arms are freely pivoted around the pipe 3 and as such will always assume a vertical position below the drip rods 5, hence as the drops of water drip from the rods they will drop onto the bars and continue dripping from bar to bar, thereby forming innumerable drops of water along the respective bars from which the chickens may drink.

Any water escaping or dripping from the lowermost bar of the grid will enter a trough 11. This trough is provided with a V-shaped guard member 12, see Fig. 2, covering a drain pipe 13 whereby any excess water dripping into the trough will be carried away.

The poultry coming up to the fountain will drink the drops dripping from bar to bar. Each chick is thus supplied with clean water at all times and the bars themselves are kept clean by the water continuously dripping over them, thus maintaining the grid in a clean, sanitary condition preventing pollution of the water or contamination.

The chickens can not drink out of the trough because of the V-shaped guard member. The water drains into the trough and gathers under the V-shaped guard member 12 and flows directly to the drain pipe 13 which carries it away.

If any of the drip rods 5 become clogged with sediment, or otherwise, it is only necessary for the caretaker to lift the rod by pushing upwardly thereon, as this will usually free the sediment and clean the rod. Any sand or sediment collecting in the feed pipe 3 can be flushed out as an open stand pipe 14 is mounted at one end, hence by fully opening the valve 4 and letting water flush through rapidly a discharge will be had through the upper end of the pipe 14 and any sediment or sand collected will be quickly removed. Also by increasing or decreasing the height of water in the stand pipe 14 by opening or closing the valve 4 more or less, the drip from the members 5 can be increased or decreased according to the head maintained in the pipe 14.

Due to the fact that the water drips from rod to rod of the grid, a partial evaporation takes place and cooling of the water is insured; also, it is obvious that the water is thoroughly aerated and that if any wind is blowing the cooling effect will be further increased. By increasing or decreasing the length of the device poultry in any number can be taken care of, hence making it suitable for yards or runs of varying size. Also, by providing the grid here disclosed it is possible for the smallest to the largest chicks to drink therefrom.

Sanitation in the operation of a fountain of this character is, of course, paramount. Means must, accordingly, be provided for preventing the poultry from roosting thereon, this being accomplished by providing a plate 16 which is pivotally mounted in the standards 2—2. Any chick tending to fly up and roost thereon will merely cause rotation of the plate 16, thereby preventing roosting. Wading in the trough is impossible and drinking therefrom is also impossible, hence the only source of supply that the chickens can reach are the drips formed along the rods of the grid or at the ends of the rods. This supply is a continuous flow and as such will always be cool and clean.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. A drinking fountain of the character described comprising a horizontally disposed feed pipe, a plurality of drip feed rods on said pipe, a grid disposed below the feed pipe and in vertical alignment with the drip rods to receive drops of water from the drip rods, said grid comprising a pair of arms pivotally hung from the feed pipe and a plurality of horizontal spaced rods secured between said arms, and means to regulate the flow of water to the drip valves.

2. A drinking fountain of the character described comprising an elongated trough, a pair of standards one at each end thereof, a horizontally disposed feed pipe carried by the upper ends of the standards, a plurality of drip feed rods on said pipe, a grid composed of horizontal spaced rods disposed below and in alignment with the drip rods to receive the drops therefrom, means for regulating the flow of water to the drip rods, and means above the feed pipe to prevent fowl from perching thereon.

3. A drinking fountain of the character described comprising an elongated trough, a pair of standards one at each end thereof, a horizontally disposed feed pipe carried by the upper ends of the standards, a plurality of drip feed rods on said pipe, a grid composed of horizontal spaced rods disposed below and in alignment with the drip rods to receive the drops therefrom, means for regulating the flow of water to the drip rods, and a guard member in the trough to prevent fowl from drinking water entering the trough.

4. In a drinking fountain of the character described the combination with a drip feed pipe, of a grid disposed below the drip feed pipe to receive drops of water dripping therefrom, said grid comprising a pair of pivotally supported arms and a plurality of horizontally disposed spaced rods secured between the arms.

FREDERICK E. BARTLETT.